United States Patent
Stirbu

(12) 
(10) Patent No.: US 7,269,730 B2
(45) Date of Patent: Sep. 11, 2007

(54) METHOD AND APPARATUS FOR PROVIDING PEER AUTHENTICATION FOR AN INTERNET KEY EXCHANGE

(75) Inventor: Vlad Alexandru Stirbu, Tampere (FI)

(73) Assignee: Nokia Corporation, Espoo (FI)

( * ) Notice: Subject to any disclaimer, the term of this patent is extended or adjusted under 35 U.S.C. 154(b) by 805 days.

(21) Appl. No.: 10/127,342

(22) Filed: Apr. 18, 2002

(65) Prior Publication Data

US 2003/0200433 A1 Oct. 23, 2003

(51) Int. Cl.
*H04L 9/00* (2006.01)
*H04K 1/10* (2006.01)

(52) U.S. Cl. ............ 713/169; 713/151; 713/155; 713/160; 713/171; 380/33

(58) Field of Classification Search ............ None
See application file for complete search history.

(56) References Cited

U.S. PATENT DOCUMENTS

| | | | |
|---|---|---|---|
| 5,150,411 A | | 9/1992 | Maurer et al. |
| 6,766,453 B1 * | | 7/2004 | Nessett et al. ............ 713/171 |
| 6,915,437 B2 * | | 7/2005 | Swander et al. .......... 713/171 |
| 2001/0023482 A1 * | | 9/2001 | Wray ........................ 713/151 |

OTHER PUBLICATIONS

3rd Generation Partnership Project; Technical Specification Group Services and System Aspects; 3G Security; Security Architecture (Release 4); 3GPP TS 33.102 V4.3.0 (Chapter 6.3), published on the Internet; Dec. 2001.

3rd Generation Partnership Project; Technical Specification Group SA3; Access security for IP-based services (Release 5); 3GPP TS 33.203 V1.0.0; Dec. 2001.

UMTS Authentication and Key Agreement; Graduate Thesis of Jon Robert Dohmen and Lars Somo Olaussen; May 2001; published on the Internet.

Public Key Infrastructure Project; published on the Internet; at least as early as Mar. 31, 2002.

Introduction to Public-Key Cryptography; p. 1-19; Graduate Thesis of Jon Robert Dohmen and Lars Somo Olaussen; published on the Internet at least as early as Mar. 29, 2002.

An Introduction to IP Security (IPSec) Encryption; published on the Internet, at least as early as Mar. 29, 2002.

(Continued)

*Primary Examiner*—Gilberto Barrón, Jr.
*Assistant Examiner*—Laurel Lashley
(74) *Attorney, Agent, or Firm*—Ware, Fressola, Van Der Sluys & Adolphson, LLP

(57) ABSTRACT

A protocol for use as a phase 1 authentication (and key agreement) IKE protocol, similar to IKE phase 1 authentication with public key encryption, but using the IMS AKA trust infrastructure instead of the PKI trust infrastructure. The invention thus allows an initiator (11) having a secret long-term key stored on a smart cart (11*a*), to authenticate a responder (12), the responder (12) having in some cases a trusted interface with a Home Subscriber Server (14) that has a copy (14*a*) of the initiator's long-term key (and in other cases having itself access to the initiator's long-term key). The protocol includes a Diffie-Hellman exchange, and by authenticating the initiator (11) and responder (12), the protocol authenticates the exchange.

24 Claims, 8 Drawing Sheets

OTHER PUBLICATIONS

The Network Access Identifier; B. Aboba, Microsoft, M. Beadles; WorldCom Advanced Networks; p. 1-6; RFC 2486 of Network Working Group published on the Internet Jan. 1999.

The Internet Key Exchange (IKE); Network Working Group; D. Harkins, D. Carrel, Cisco Systems; RFC 2409 of the Network Working Group, Nov. 1998; published on the Internet.

The TLS Protocol, Version 1.0; RFC 2246; Network Working Group; T. Dierks, Certicom, C. Allen, Certicom; Jan. 1999; published on the Internet.

PIC, A Pre-IKE Credential Provisioning Protocol; IPSRA Working Group; Y. Sheffer, Feb. 11, 2002; published on the Internet.

* cited by examiner

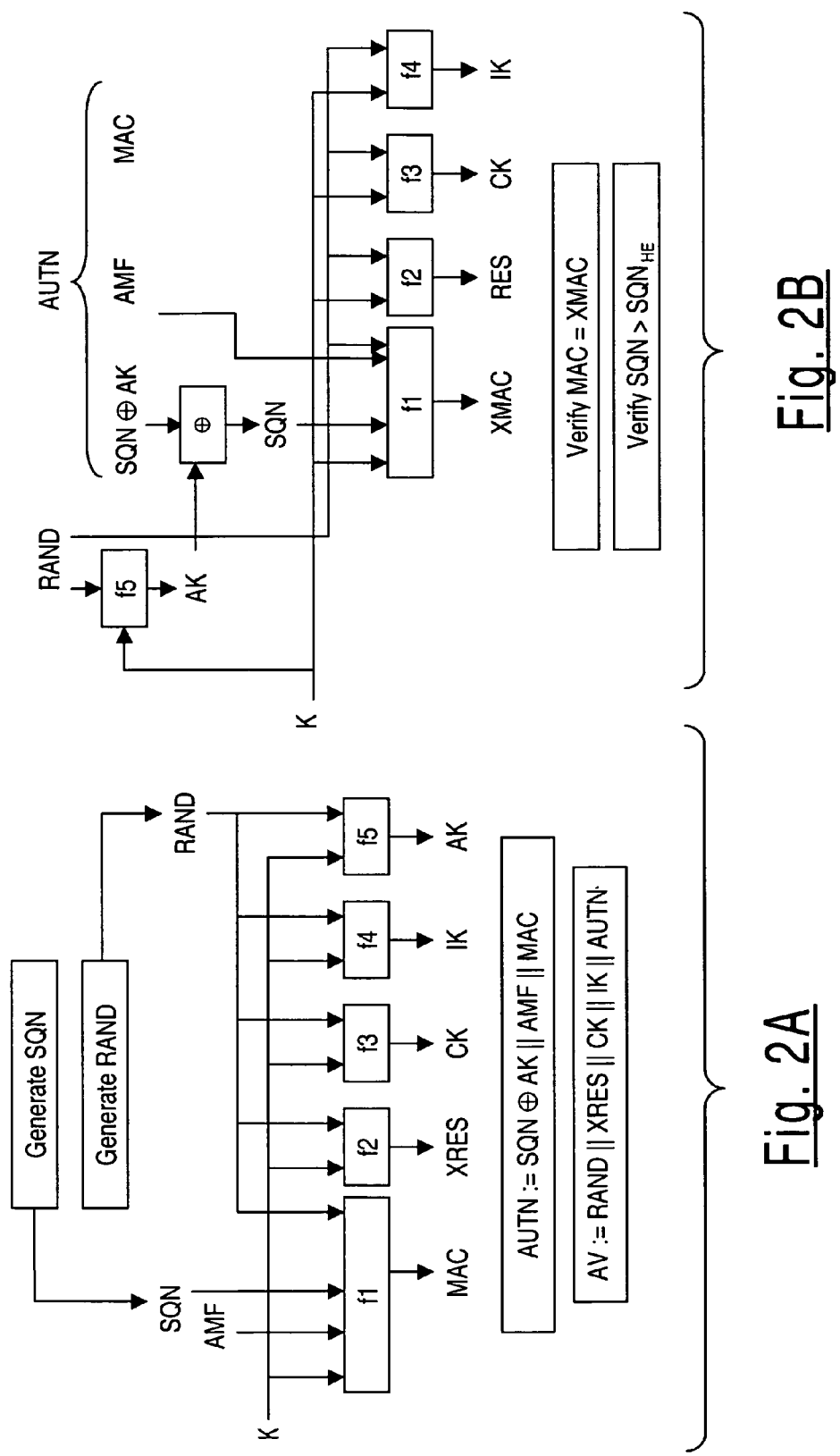

METHOD AND APPARATUS FOR PROVIDING PEER AUTHENTICATION FOR AN INTERNET KEY EXCHANGE

TECHNICAL FIELD

The present invention relates to authenticating peers in a digital communication protocol, and more particularly to doing so without using a public key infrastructure.

BACKGROUND ART

According to Third Generation Partnership Project (3GPP) Technical Specification (TS) 33.203 V1.0.0 (Access Security for IP-based Services), the IMS (i.e. Internet Protocol (IP) Multimedia Core Network Subsystem or IP Multimedia Subsystem) in UMTS (Universal Mobile Telecommunications System) supports IP Multimedia applications such as conferencing using audio, video, and multimedia. 3GPP has chosen Session Initiation Protocol (SIP) as the signaling protocol for creating and terminating Multimedia sessions for wireless terminals, including mobile phones, laptop computers with a WLAN (wireless local area network) card and a USIM/ISIN (UMTS Subscriber Identity Nodule/IP Multimedia Private Identity), and other kinds of UE (user equipment). TS 33.203 sets out how a subscriber to IMS services is authenticated and how a subscriber authenticates the IMS, according to what is called IMS Authentication and Key Agreement (IMS AKA), which is patterned after the UMTS AKA set out in TS 33.102. (Every operator and even third parties can provide IMS services; thus not only is it necessary to authenticate that a user (i.e. the UE) is a subscriber, but it is also necessary to authenticate that the entity providing IMS services to the user is who it claims to be.)

Authentication allows each party to a communication to trust that the other is who it purports to be. Having such trust is necessary for the communicating parties to encrypt messages for each other and to rely on a digital signature purportedly provided by the other. In case of encryption, for example, when sending a message, the parties to a communication must each rely on their having a key appropriate for the receiving party and not a key that would allow an eavesdropper to decrypt the message. A set of protocols, procedures, and associated agreements that allow communicating entities to trust that each is who it purports to be, so that keys that are used for digital signatures and encryption are genuine, is called a trust infrastructure.

All trust infrastructures ultimately rely on some information being provided "out-of-band," i.e. on some transaction not susceptible to the eavesdropping that might occur in a communication using the trust infrastructure. The out-of-band information is typically (if not always) a (public) key or keys associated with an identity (of the owner of the key). For enabling a UTRAN (UMTS Terrestrial Radio Access Network) to authenticate a user and vice versa, UMTS AKA relies on a private key associated with the user, i.e. associated with the UMTS Subscriber Identity Module (USIM) in the UE operated by the user. The key is provided out-of-band to the USIM in the UE and is also provided out-of-band to a so-called authorization center (AuC), a facility that is part of the home environment for the user. The identity to be associated with the key is of course provided along with the key, but authentication does not rely on keeping secret the identity associated with the private key.

Similarly, IMS AKA, in providing a trust infrastructure for accessing IM services via a mobile phone, uses a private key exchanged out-of-band between an ISIM (IM Services Identity Module, playing a role analogous to that played by the USIM for general UMTS services) and an IM authorization center; the key is associated with an IP Multimedia Private Identity (IMPI) provided by the manufacturer of the mobile phone and stored in the ISIM.

Outside of the context of accessing IM services, authentication is sometimes performed using what is called a Public Key Infrastructure (PKI) as the trust infrastructure. A PKI makes use of what are called certification authorities (CAs) to issue so-called digital Certificates; because the Certificates are issued by a CA out-of-band to entities seeking to enable others to authenticate them, it is these digital certificates that are the out-of-band component of the trust infrastructure provided by PKI. Such Certificates provide for the secure distribution of Public Keys (for use in asymmetric key encryption), which in effect authenticates the participants in a communication (since the corresponding private keys can be used to digitally sign documents), i.e. the process of securely obtaining the public key of an entity is tantamount to authenticating the entity. Like almost all (if not all) out-of-band information serving as the basis for trust, a Certificate is a structured document that binds the name of a participant in a communication (or similar information) to a public key (the participant's public key), and is digitally signed by a trusted third party called a Certification Authority or CA. To verify a certificate, the user of the public key (sometimes called the relying party) must first obtain the public key of the CA by some other (out-of-band) trusted means. If this is done, then if the CA is able to certify the public key of other CAs, which can in turn certify other CAs and so on, then an entity relying on the (trusted) CA will be able to securely communicate with any other entity for which there is a chain of certificates between the trusted CA and the CA certifying the key of the other entity.

A PKI includes not only a sufficiently interlinked network of CAs to ensure that any relying party can verify any given certificate, but also systems to issue and store certificates, to determine their authenticity, and to revoke certificates if keys become compromised, as well as possibly other services in connection with effectively utilizing public key cryptography and digital signatures, such as a non-repudiation service and a digital notary or digital time-stamping service. All of these services must work together and have a common understanding of the formats and protocols necessary to achieve their aims. It is the collection of these components that has come to be known as a PKI.

As set out in The Internet Key Exchange (IKE), RFC 2409 of the Network Working Group, the IKE protocol is a hybrid protocol for providing authenticated keying material for security associations in a protected manner, or in other words, for enabling each party in a communication between two parties to authenticate the other and then provide keying material with confidence that the keying material is associated with the intended party and not some imposter. Processes which implement the IKE protocol can be used for negotiating virtual private networks (VPNs) and also for providing a remote user from a remote site (whose IP address need not be known beforehand) access to a secure host or network.

The IKE protocol supports initiator negotiation, i.e. the protocol can be used in so-called initiator mode. Initiator mode is where the negotiating parties are not the endpoints for which security association negotiation is taking place. When used in initiator mode, the identities of the end parties remain hidden.

IKE presents different exchanges as modes which operate in one of two phases. Phase 1 is where the ISAKMP (Internet Security Association Key Management Protocol) peers (in the communication between the two parties) establish a secure, authenticated channel by which to communicate. This is called the ISAKMP Security Association (SA). IKE then provides a so-called Main Mode (for first beginning a communication session) and a so-called Aggressive Mode (to restart a communication session after the session is terminated because of there having been no activity for a predetermined time, for example), each accomplishing a phase 1 exchange. Phase 2 is where Security Associations are negotiated on behalf of services such as IPsec or any other service which needs key material and/or parameter negotiation. A so-called Quick Mode accomplishes a phase 2 exchange.

Section 5 of RFC 2409 provides several different kinds of phase 1 authentications, such as authentication with digital signatures (section 5.1) and also authentication with public key encryption (section 5.2). Authentication with public key encryption relies on there being a PKI trust infrastructure in place. Because a large-scale PKI has yet to be implemented, and because of the complexity of such an infrastructure, it would be advantageous to have available for use an additional phase 1 authentication, similar to the authentication with public key encryption, but relying on a trust infrastructure that has already been implemented.

DISCLOSURE OF THE INVENTION

Accordingly, in a first aspect of the invention, a method is provided by which an initiator, having a secret key, authenticates a responder, and vice versa, the method including a public key exchange, the method characterized by: a step in which the initiator sends the responder a message claiming an identity of the initiator; and a step (or set of steps) in which authentication of both the initiator and the responder is performed based on information derived from, but not revealing, the secret key.

In accord with the first aspect of the invention, in the step in which authentication is performed, the information derived from, but not revealing, the secret key may be determined by the initiator using the secret key but may be provided to the responder by a third-party entity distinct from the responder and trusted by the responder. Further, the step in which authentication is performed may in turn include: a step in which the responder, in response to a message flow from the initiator and also in response to an authentication field and a random number field provided by the third-party entity, may provide the authentication field and the random number field to the initiator; and a step in which the initiator, in response to the authentication field and the random number field, may test whether the responder is authentic based on information conveyed by the authentication field and also based on the random number field. Further still, the step in which authentication is performed may also in turn include: a step in which if the initiator determines the responder to be authentic, then the initiator may calculate a result field based on the secret key and the random number field. Also further still, the step in which authentication is performed may also include: a step in which the third-party entity may derive the authentication field from the secret key. Also further still, the step in which authentication is performed may also include: a step in which the third-party entity may send to the responder a message including an expected result field; and a step in which the responder may use the result field to test whether the initiator is authentic by comparing the result field with the expected result field.

Also in accord with the first aspect of the invention, in the step in which authentication is performed, the information derived from, but not revealing, the secret key may be determined by the initiator using the secret key and also by the responder using the secret key.

Also in accord with the first aspect of the invention, a shared secret is obtained based on information derived from, but not revealing, the secret key.

In a second aspect of the invention, an initiator apparatus is provided, characterized in that it is operative according to the first aspect of the invention in respect to the initiator.

In a third aspect of the invention, a responder apparatus is provided, characterized in that it is operative according to the first aspect of the invention in respect to the responder.

In a fourth aspect of the invention, a digital communication system is provided, including an initiator apparatus, a responder apparatus, and a third-party entity apparatus, characterized in that the initiator apparatus, the responder apparatus and the third-party entity apparatus are operative according to the first aspect of the invention in respect to the initiator, the responder, and the third-party entity respectively.

In a fifth aspect of the invention, a digital communication system is provided, including an initiator apparatus and a responder apparatus, characterized in that the initiator apparatus and the responder apparatus are operative according to the first aspect of the invention in respect to the initiator and the responder respectively.

BRIEF DESCRIPTION OF THE DRAWINGS

The above and other objects, features and advantages of the invention will become apparent from a consideration of the subsequent detailed description presented in connection with accompanying drawings, in which:

FIG. 2A is a schematic of the calculations performed (in a Home Subscriber Server, acting as a third-party entity/server) in generating an authentication vector (and providing an expected response XRES);

FIG. 2B is a schematic of the calculations performed (in an ISIM of a UE) in authenticating a network (and in generating a response RES);

BEST MODE FOR CARRYING OUT THE INVENTION

To allow an initiator (such as a wireless terminal) and a responder (such as a provider of Web-based services), communicating via a UTRAN or other wireless radio access network (digital communication system), to authenticate each other (and then to negotiate an encryption algorithm and cryptographic keys), the invention provides a phase 1 authentication protocol for Main Mode and a phase 1 authentication protocol for Aggressive Mode based on the IMS AKA trust infrastructure instead of the PKI trust infrastructure. The phase 1 authentication protocols provided by the invention are patterned after corresponding phase 1 authentication protocols based on public key encryption, as set out in a request for comments prepared and published by the Network Working Group, namely RFC 2409, entitled, The Internet Key Exchange (IKE), and more specifically in section 5.2 of that document; RFC 2409 is hereby incorporated by reference as background material.

Figure 1:
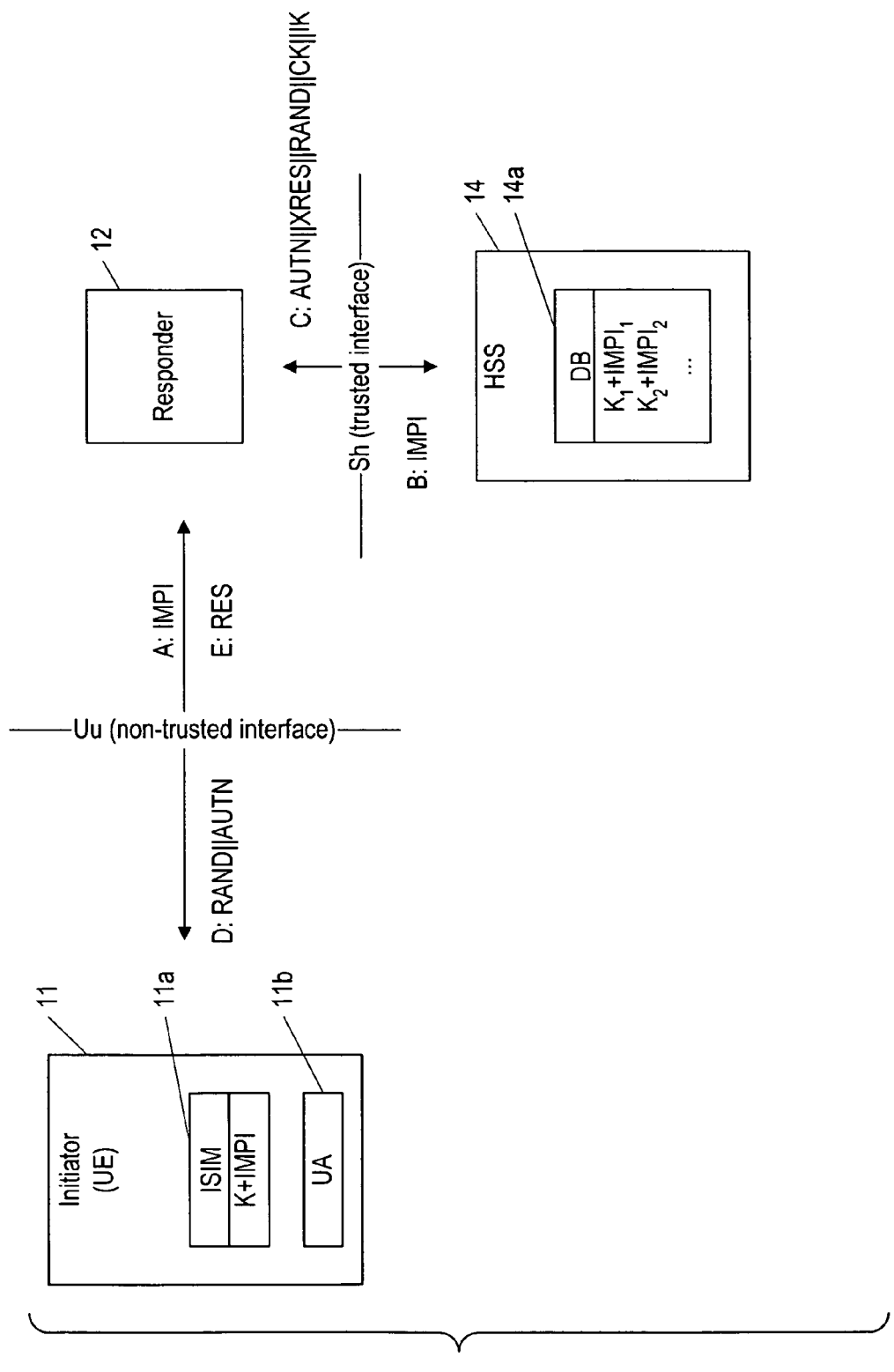
FIG. 1 is a block diagram indicating entities being authenticated according to the invention and showing the basic messages being exchanged according to the IMS AKA protocol, which is also how, in essence, the entities are authenticated in the phase 1 IKE authentication provided by the invention.

Referring now to FIG. 1, the IMS AKA trust infrastructure is shown being used in a phase 1 IKE authentication in a context where an initiator 11 has a non-trusted interface with a responder 12, which in turn has a trusted interface (called the Sh interface) with a Home Subscriber Responder (HSS), which holds a database holding (long-term key) information shared only with the initiator (and also corresponding information for other entities). FIG. 1 is an excerpt of the full phase 1 IKE authentication according to the invention, called here the IKE AKA protocol. (IMS AKA provides, besides authentication, input for key agreement, however authentication with public key encryption, i.e. section 5.2 of RFC 2409, provides only authentication, but in doing so exchanges information used for keying. In other words, while public key encryption only authenticates and encrypts some parameters, AKA authenticates the peers and provides an integrity key (IK) as an input to the formula used to calculate a shared secret, the field SKEYID, as described below.) FIGS. 3B and 3C in combination show the full IKE AKA protocol of the invention. FIG. 1 is also an excerpt of the IMS AKA Protocol, an excerpt of the components that the invention inserts into the IKE phase 1 authentication protocol based on public key encryption to arrive at the IMS AKA Protocol.

In FIG. 1, the initiator 11 includes, on a so-called smart card (which includes a microprocessor as well as non-volatile memory), an ISIM (TM Subscriber Identity Module) 11a that in turn includes a (so-called long-term) key K and an IM Private Identity (IMPI) associated with (i.e. bound to) the key K; the key K is provided out-of-band, i.e. not using the UTRAN, usually by the smart-card manufacturer at the time of manufacture of the smart card. In some embodiments, the responder 12, unlike the initiator, does not include an ISIM with the shared key K, but instead obtains from the HSS 14 information derived from the secret key K; it is information derived from the key K that is used by the responder to authenticate the initiator and vice versa. The invention also comprehends embodiments in which the responder does include the shared key K and does not need to communicate with an HSS in order to authenticate the client. The invention is described below for embodiments where the responder relies on an HSS to provide information derived from the secret key K, as indicated in FIG. 1, except where otherwise noted.

Still referring to FIG. 1 and also now to FIG. 2A, and following 3GPP TS 33.102, section 6, after the initiator indicates the need for authentication by sending its IMPI to the responder, the initiator and responder authenticate each other on the basis of the secret key K held in the initiator ISIM 11a without the key K ever being communicated in-band (across the radio access network). More specifically, in a message flow A, the initiator indicates its IMPI to the responder, which then in a message flow B (that includes the IMPI of the initiator) requests from the HSS (for the initiator) what is called an authentication vector (AV), which is a concatenation of an authentication token AUTN, and expected response XRES from the initiator, and a random number RAND (as shown in FIG. 2A), where AUTN is itself a concatenation of fields: a sequence number SQN logically added (i.e. combined using an AND operation) to an anonymity key AK derived from the secret key K, as shown in FIG. 2A (i.e. via a function f5); an authentication and key management field AMF (having values set so as to be of use for various purposes including for example to allow handling multiple authentication algorithms and keys, changing sequence number verification parameter sets, and setting threshold value to restrict the lifetime of cipher keys CK and integrity keys IK); and a message authentication code MAC also derived from the secret key K (via the function f1). (The functions f1-f5 are well-known, and are the same as are used in UMTS AKA.) Then in a message flow C, the HSS returns the authentication vector AV (containing the AUTN, RAND, XRES, IK, and CK).

Now also referring to FIG. 2B, in a next message flow D, called an authentication request, the responder 12 provides the initiator 11 with the random number RAND and the authentication token AUTN; the initiator then verifies the authentication token AUTN, as described below, and, assuming the AUTN is verified (which authenticates the responder), computes a response RES (as indicated in FIG. 2B, i.e. using the function f2).

To verify the AUTN, upon receipt of RAND and AUTN the USIM first computes the anonymity key $AK=f5_K$(RAND) and retrieves the sequence number SQN=(SQN∥AK)∥AK. Next the USIM computes $XMAC=f1_K$(SQN∥RAND∥AMF) and compares this with MAC, which is included in AUTN. If they are different, the initiator sends user authentication reject back to the responder with an indication of the cause, and the initiator abandons the procedure.

Next the USIM verifies that the received sequence number SQN is in the correct range. If the USIM considers the sequence number to be not in the correct range, it sends synchronization failure back to the VLR/SGSN including an appropriate parameter, and abandons the procedure. If the sequence number is considered to be in the correct range however, the USIM computes $RES=f2_K$(RAND) and includes this parameter in a user authentication response back to the VLR/SGSN. (Finally the USIM computes the cipher key $CK=f3_K$(RAND) and the integrity key $IK=f4_K$ (RAND). Note that RES, CK and IK can also be computed earlier at any time after receiving RAND, and doing so is sometimes more efficient.)

Upon receipt of user authentication response, the responder 12 compares RES with the expected response XRES provided by the HSS as part of the authentication vector. If XRES equals RES, then the initiator 11 is authenticated; otherwise, the responder sends an Authentication Failure Report procedure to the HSS. The responder also selects the appropriate cipher key CK and integrity key IK from the selected authentication vector. The CK and IK keys are used in the authentication process to exchange information that is used as keying material. See FIGS. 3B and 5B to see the usage of the CK key. The IK key is used to compute the string SKEYID, which is done differently for each authentication method. The string SKEYID is in turn used to derive authenticated keying material (as also explained in RFC 2409 in section 5, and as set out below). IKE Phase 1 Authentication with AKA (i.e. the invention) is a hybrid between IKE Phase 1 Authentication with Public Key Encryption and IKE Phase 1 Authentication with Pre-shared Key; it takes from authentication with PKI, the authentication of the peers (see FIGS. 3B and 5B), and from authentication with pre-shared keys, the way to derive SKEYID.

Now, as mentioned above, the IKE phase 1 authentication with public key encryption (as set out in section 5.2 of RFC 2409) provides for a Main Mode and an Aggressive Mode. Each generates authenticated keying material from an ephemeral Diffie-Hellman (DH) exchange. In Main Mode: the first two messages negotiate policy; the next two exchange Diffie-Hellman public values and ancillary data (e.g. nonces, i.e. random numbers) necessary for the exchange; and the last two messages authenticate the Diffie-Hellman Exchange.

In Aggressive Mode: the first two messages negotiate policy, exchange Diffie-Hellman public values and ancillary data necessary for the exchange, and identities; the second message authenticates the responder; and the third message authenticates the initiator and provides a proof of participation in the exchange.

For the pre-shared key mode, instead of using the formula,

SKEYID=prf(pre-shared-key, $Ni\_b|Nr\_b$), as set out in per RFC 2409, section 5, SKEYID is determined according to the invention using the formula, SKEYID=prf(IK, $Ni\_b|Nr\_b$), in which the symbology a|b indicates concatenation of strings a and b, and where Nx (meaning either Ni or Nr) is the so-called nonce payload (a random number), in which if x is i, the initiator is indicated, and if x is r, the responder is indicated. (Further, note that Nx is used to indicate the nonce and an ISAKMP header, and Nx_b is used to indicate the same quantity without the ISAKMP header.)

In addition to an agreed-upon policy to protect further communications, the result of either Main Mode or Aggressive Mode is three groups of authenticated keying material:

SKEYID_d=prf(SKEYID, $g^{xy}$|CKY-I|CKY-R|0)

SKEYID_a=prf(SKEYID, SKEYID_d|$g^{xy}$|CKY-I|CKY-R|1)

SKEYID_e=prf(SKEYID, SKEYID_a|$g^{xy}$|CKY-I|CKY-R|2)

where $g^{xy}$ is the Diffie-Hellman shared secret, SKEYID_a is the keying material used by the iSAKMP SA to authenticate its messages, and SKEYID_a is the keying material used to derive keys for non-ISAKMP SAs. The values of 0, 1, and 2 above are represented by a single octet. The key used for encryption is derived from SKEYID_e (the keying material used by the ISAKMP SA to protect the confidentiality of its messages) in an algorithm-specific manner.

To authenticate either exchange the initiator of the protocol generates a HASH_I value and the responder generates a HASH_R value, given by:

HASH_I=prf(SKEYID, $g^{xi}|g^{xr}$|CKY-I|CKY-R|SAi_b|IDii_b), and

HASH_R=prf(SKEYID, $g^{xr}|g^{xi}$|CKY-R|CKY-I|SAi_b|IDir_b), in which: $g^{xi}$ and $g^{xr}$ are the Diffie-Hellman public values of the initiator and responder, respectively; SAi_b conveys proposals for security associations offered by the initiator; and IDix_b indicates the identification of x (x being either i to indicate the initiator or r to indicate the responder).

For authentication with public key encryption, HASH_I and HASH_R directly authenticate the exchange. Using public key encryption to authenticate the exchange, the ancillary information exchanged is encrypted nonces. Each party's ability to reconstruct a hash (proving that the other party decrypted the nonce) authenticates the exchange. In order to perform the public key encryption, the initiator must already have the responder's public key. In the case where the responder has multiple public keys, a hash of the certificate the initiator is using to encrypt the ancillary information is passed as part of the third message. In this way the responder can determine which corresponding private key to use to decrypt the encrypted payloads and identity protection is retained. In addition to the nonce, the identities of the parties (IDii and IDir) are also encrypted with the other party's public key. When the authentication method is public key encryption, the nonce and identity payloads are encrypted with the public key of the other party; only the body of the payloads are encrypted, the payload headers are left in the clear.

Figure 3A:
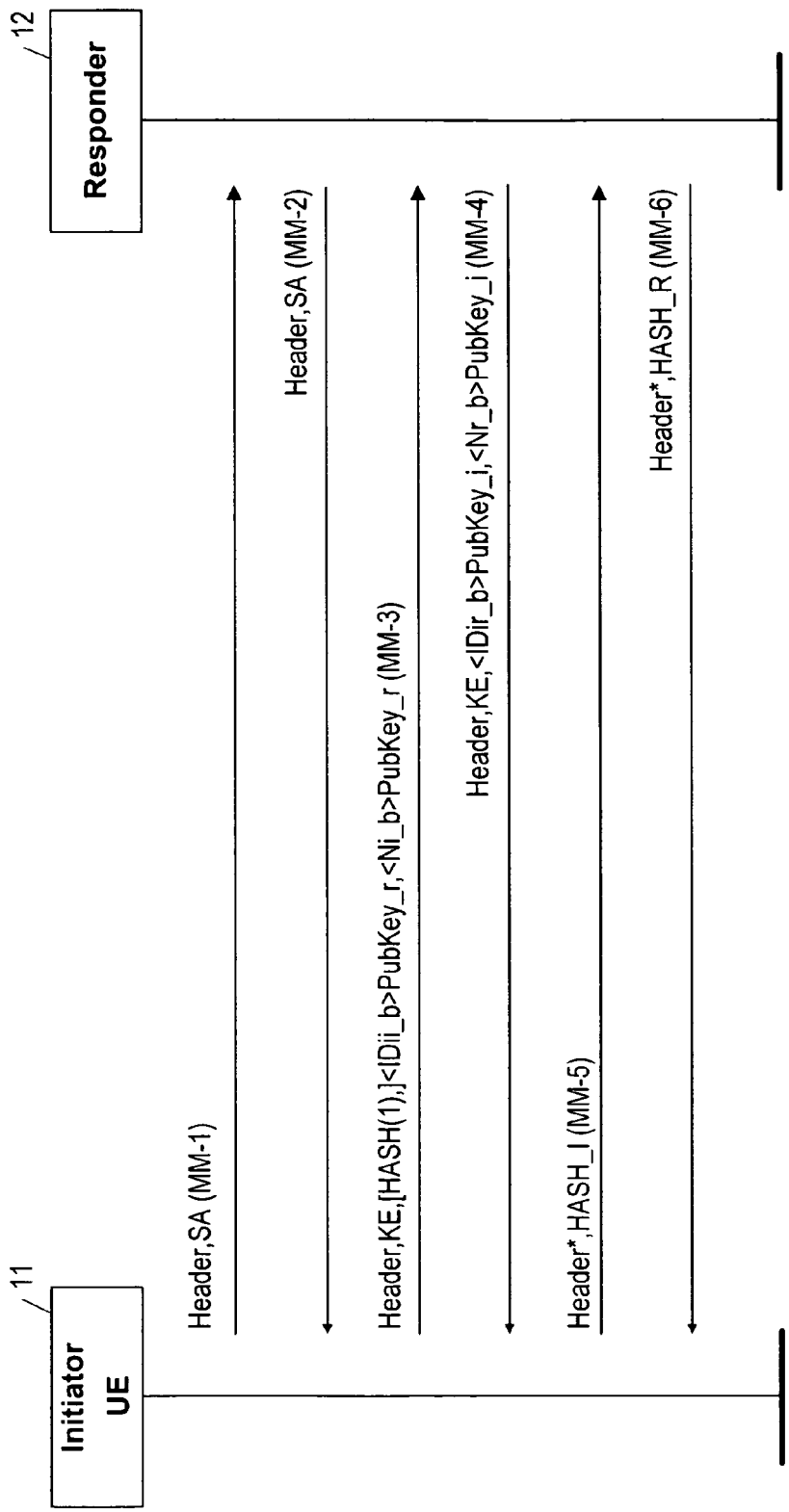
FIG. 3A is a messaging sequence diagram for the IKE phase 1 authentication with pubic key encryption in Main Mode, according to the prior art (i.e. using the PKI trust infrastructure)
Figure 3B:
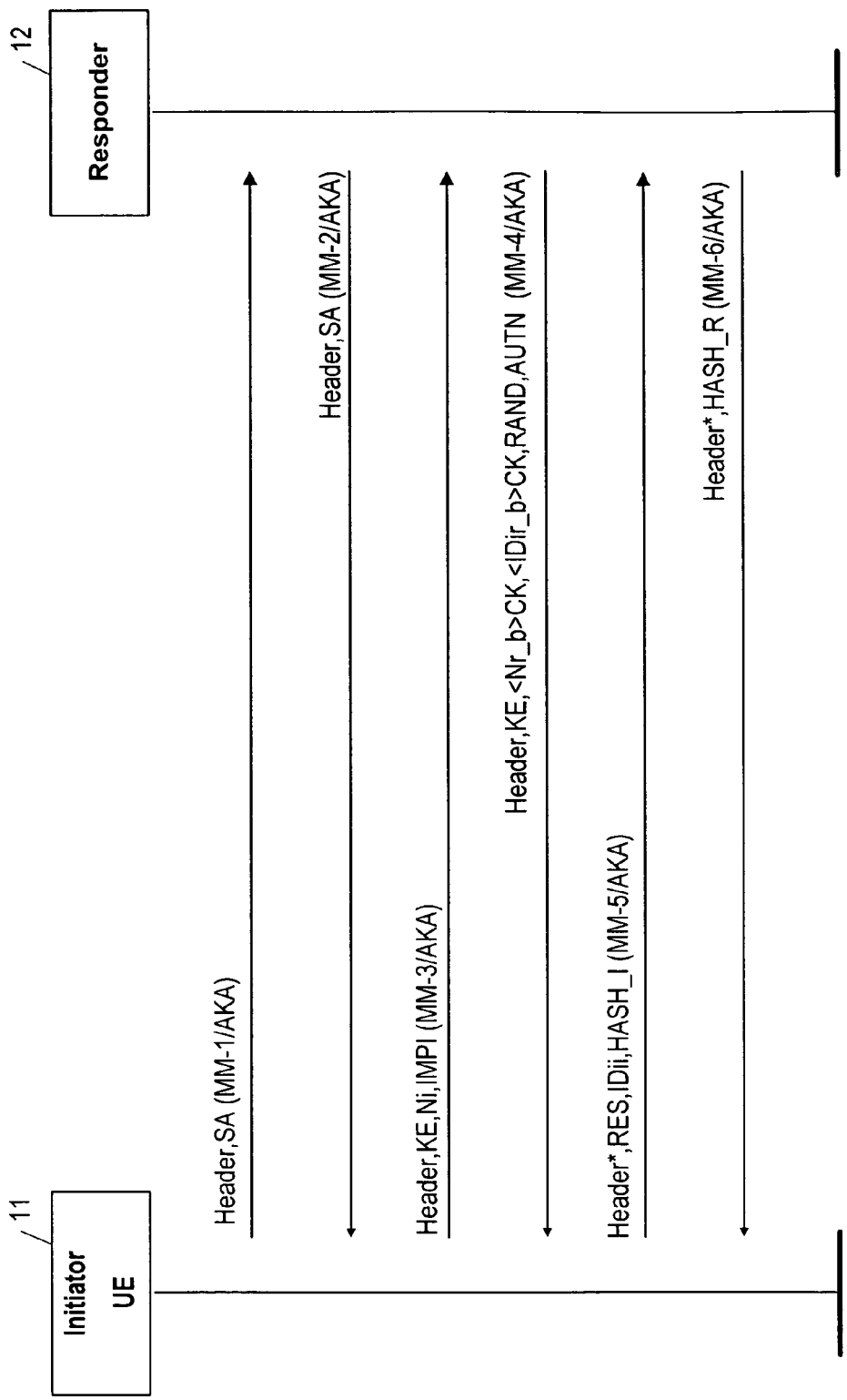
FIG. 3B is a messaging sequence diagram for the IKE phase 1 authentication in Main Mode according to the invention, i.e. using the IMS AKA trust infrastructure, shown in respect to only an initiator and a responder (and not showing the message flows between the responder and the HSS for the initiator)
Figure 3C:
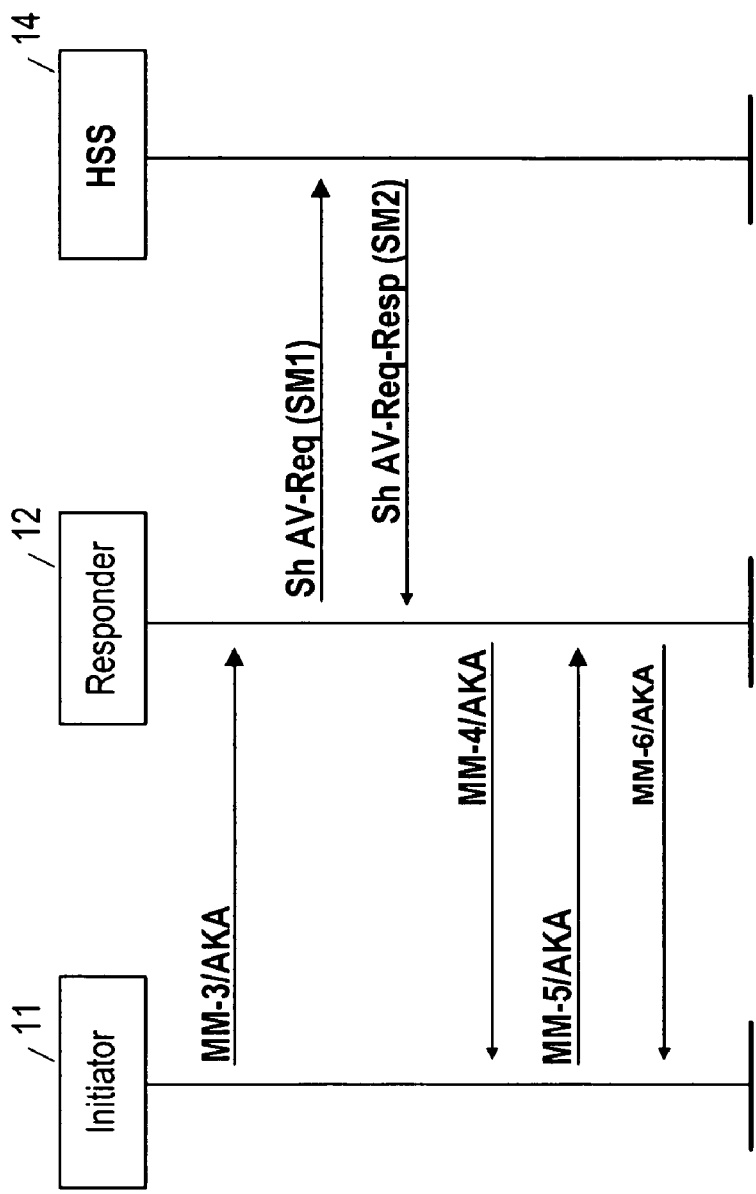
FIG. 3C is a messaging sequence diagram for the IKE phase 1 authentication in Main Mode according to the invention, showing messaging between the responder and the HSS having a copy of the secret key of the initiator (the secret key that is the basis for the IMS AKA trust infrastructure)

Thus, referring now to FIG. 3A, the IKE phase 1 Main Mode authentication (the prior art, and so using a PKI trust infrastructure) is shown as a message sequence diagram including message flows MM-1 through MM-6, each including one or more messages (as indicated). First, the initiator 11 sends a message flow MM-1 to the responder 12 including a header (data item), identifying the mode, and an SA (data item), the SA being an SA negotiation payload with one or more proposals for security associations (such as hash functions or encryption algorithms). In the message flow MM-2, the responder 12 responds with a header and an SA (providing the particular security association from among the security associations proposed by the initiator that is acceptable to the responder). In MM-3, the initiator sends the responder a header, a KE (the key exchange data/payload that contains the public information exchanges in a Diffie-Hellman exchange), and a third quantity

[HASH(1),]<IDii_b>PubKey_r,<Ni_b>PubKey_r, in which [HASH(1)] indicates an optional (by virtue of the square brackets) hash value of the certificate it will use from among possibly several different certificates (and so for indicating to the responder which of the possibly several certificates the initiator will use), in which angle brackets indicate that the data enclosed in the angle brackets is encrypted using the key indicated following the brackets, and in which Ni_b is a nonce. (An asterisk following a header indicates that the payload preceded by that header is encrypted.)

With MM-1, the initiator tells the responder what type of exchange is initiated and proposes SAs (cryptographic algorithms). In MM-2, the responder replies to the initiator with an SA the responder decides on; to do so, the responder picks up from the proposed set of SAs the one that best fits the policy it uses. In MM-3, the initiator initiates a DH exchange (i.e. the first step of the series of steps leading to a shared secret), and sends the responder the identification of the initiator (i.e. IDii) and also a nonce, both encrypted with the public key of the responder. In MM-4, the responder completes the DH exchange, and provides its ID and a nonce both encrypted using the public key of the initiator. In MM-5, a hash based on the nonce provided to the initiator in MM-4 is sent to the responder, allowing the responder to authenticate the DH exchange (i.e. to ensure the responder that it can prudently assume that it now shares a key with the entity the initiator proclaims to be, and not an imposter), and in MM-6, the responder sends a corresponding hash value to the initiator, thereby allowing the initiator to also authenticate the DH exchange.

It is on the basis of the use of the encryptions of the IDs and nonces, using the recipients' public keys, that authentication is made possible; the DH exchange then provides a shared key for use by the authenticated initiator and responder.

Referring now to FIGS. 3B and 3C, the IKE AKA protocol for phase 1 authentication (and key agreement) in Main Mode is shown as a message sequence diagram that is the same as in the IKE phase 1 authentication using public key encryption (FIG. 3A) for Main Mode with respect to the initiator 11 and responder 12, except that the contents of the MM-3 through MM-5 message flows are changed to replace the PKI trust infrastructure elements (the certificates and corresponding keys) with the IMS AKA trust infrastructure elements (which are conveyed via the IMPI, AUTN and RAND fields). The message flows according to the invention are indicated as MM-x/AKA for Main Mode, and MA-x/AKA for aggressive mode.

Still referring to FIGS. 3B and 3C, MM-1/AKA and MM-2/AKA are unchanged from MM-1 and MM-2, respectively. In the MM-3 message flow, the fields,

[HASH(1),]<IDii_b>PubKey_r,<Ni_b>PubKey_r, are replaced by

Ni,IMPI, to make the IMS-3/AKA message flow. In the MM-4 message flow,

KE,<IDir$_{13}$ b>PubKey_i,<Nr_b>PubKey_i is replaced by,

KE,<Nr_b>CK,<IDir_b>CK,RAND,AUTN to make the MM-4/AKA message flow. Finally, to form the MM5/AKA message flow, the response RES of IMS AKA and the field IDii are added to the contents of the MM-5 message flow.

Referring now in particular to FIG. 3C, the message flows of the IKE AKA protocol for phase 1 authentication are shown as also including message flows between the responder 12 and the HSS 14, i.e. across the (well-known) Sh interface, message flows by which the HSS provide the responder with the AUTN, XRES, and RAND fields (as indicated in FIG. 1). In Sh AV-Req (SM1), the SM1 message of the TLS AKA protocol as set out in 3GPP TS 33.203 (and see also 3GPP TS 33.102 for more detail) essentially communicates the IMPI of the initiator 11 to the HSS by way of a request for an AV (authentication vector). In response, the HSS issues an Sh AV-Req-Resp (SM2), which provides the AUTN, XRES, and RAND fields as components of an AV.

Figure 4:
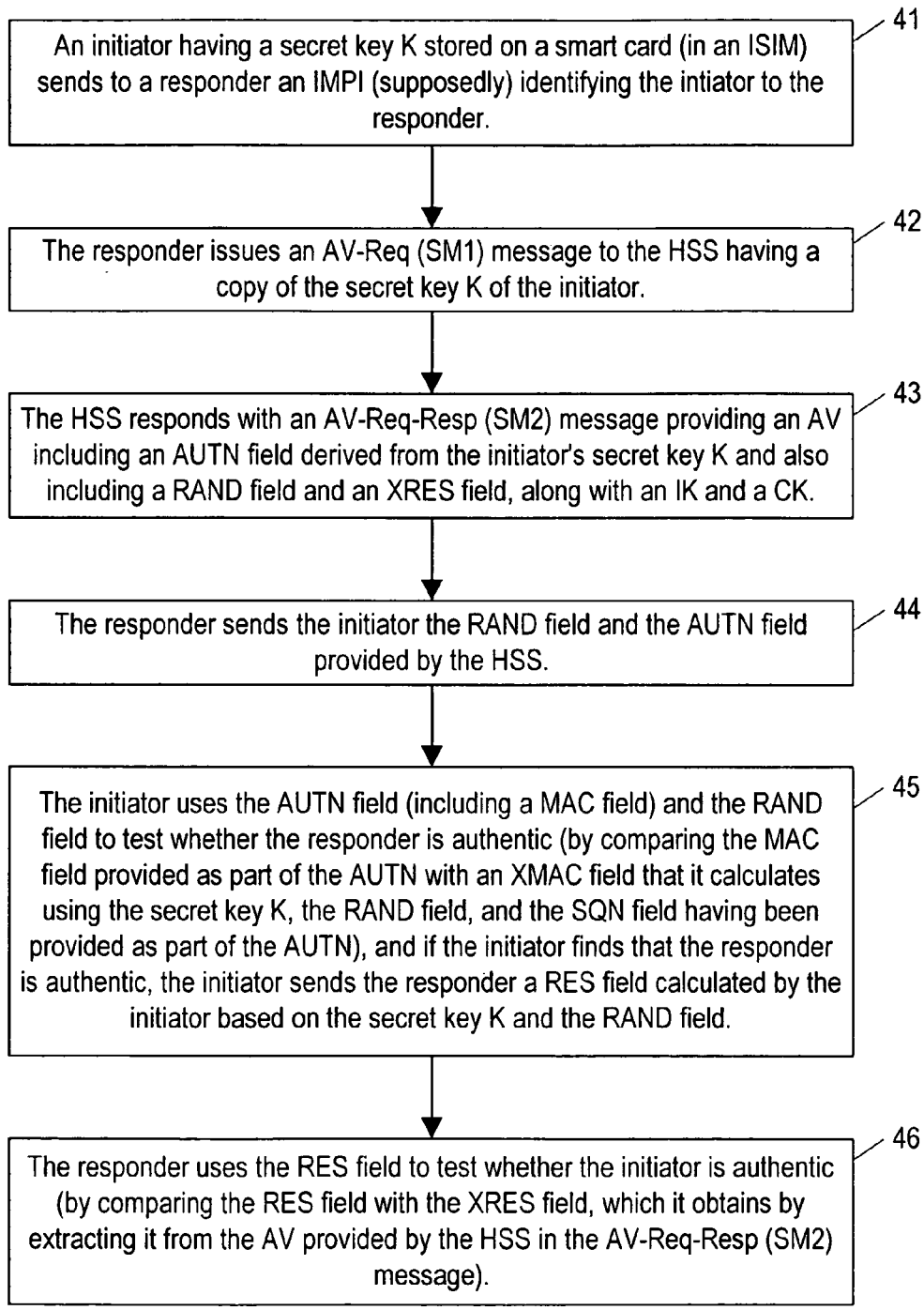
FIG. 4 is a flowchart indicating the steps of the IKE phase 1 authentication in Main Mode according to the invention.

Referring now to FIG. 4, a flowchart of the IKE AKA protocol in respect only to authentication, and in respect to both Main Mode as well as Aggressive Mode, is shown as including a step 41 in which the initiator 11 having a secret key K stored on a smart card (in an ISIM 11a) sends to the responder 12 its IMPI. In a next step 42, the responder issues an AV-Req (SM1) message to the HSS 14 having (in a database 14a) a copy of the secret key K of the initiator.

Next, in a step 43, the HSS responds with an AV-Req-Resp (SM2) message providing an AV including an AUTN field derived from the initiator's secret key K and also including a RAND field and an XRES field. In a next step 44, the responder sends the initiator a responder Hello message and provides the RAND field and the AUTN field to the initiator. In a next step 45, the initiator uses the AUTN field (including a MAC field) and the RAND field to authenticate the responder (i.e. to test whether the responder is authentic, by comparing the MAC field provided as part of the AUTN with an XMAC field that it calculates using the secret key K, the RAND field, and the SQN field having been provided as part of the AUTN), and if the initiator finds that the responder is authentic, the initiator sends the responder a RES field calculated by the initiator based on the secret key K and the RAND field, the RES field then being provided by the initiator to the responder. In a next step 46, the responder uses the RES field to test whether the initiator is authentic by comparing the RES field with the XRES field that it extracts from the AV provided by the HSS in the AV-Req-Resp (SM2) message. The key agreement part of the protocol, i.e. the DH exchange, is interwoven in the above steps, as indicated in FIGS. 3B and 3C.

Figure 5A:
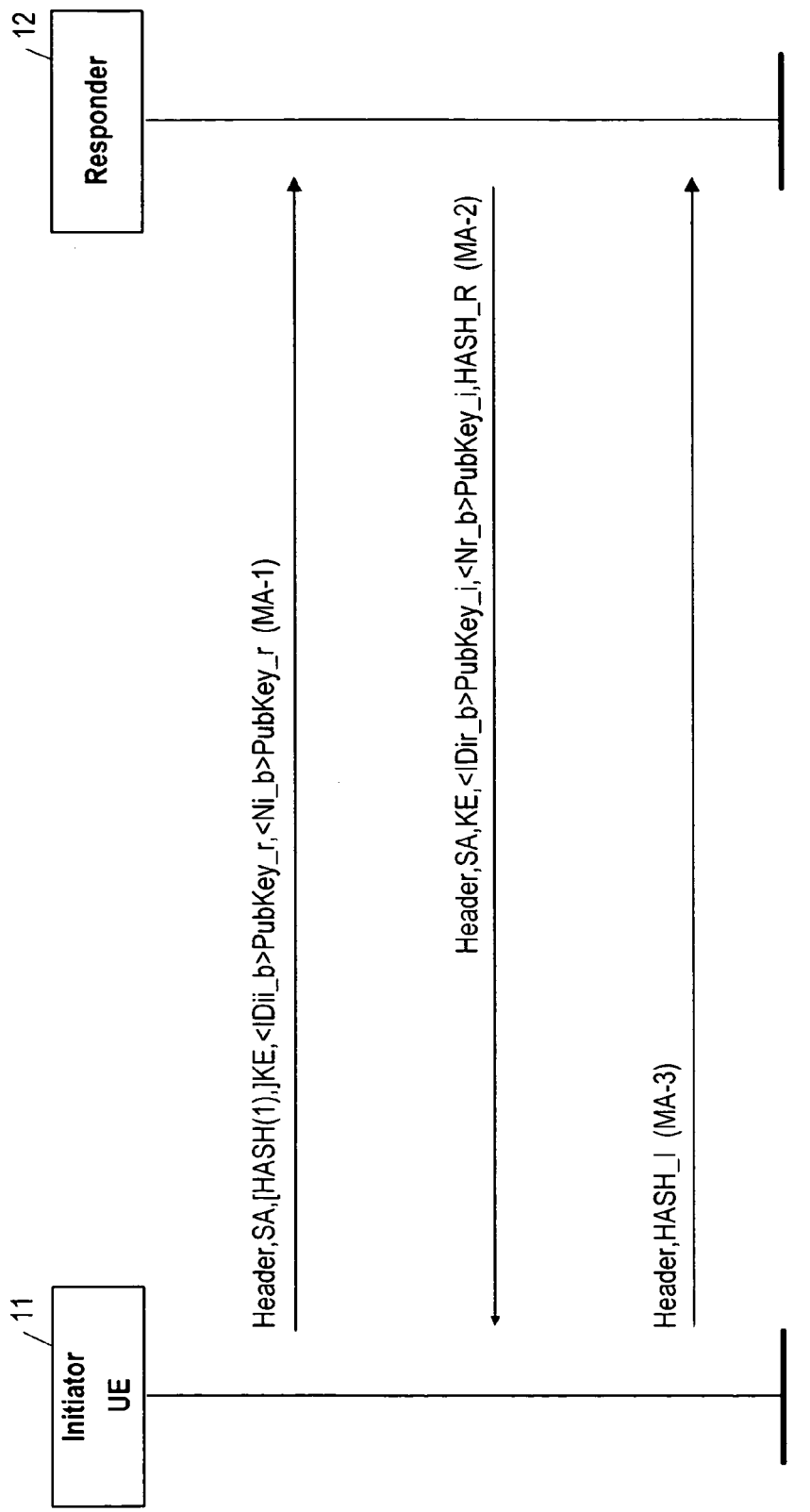
FIG. 5A is a messaging sequence diagram for the IKE phase 1 authentication with pubic key encryption in Aggressive Mode, according to the prior art (i.e. using the PKI trust infrastructure)

Referring now to FIG. 5A, the IKE phase 1 Aggressive Mode authentication (again the prior art, and so again using a PKI trust infrastructure) is shown as a message sequence diagram including message flows MA-1 through MA-3, each including one or more messages (as indicated). Since a security association is already agreed on for an Aggressive Mode authentication, handshaking to arrive at one is not needed, and so MA-1 combines the data flows MM-1 and MM-3 of the Main Mode (with SA in MA-1 just indicating the previously agreed-on security association, not proposals for one). Thus, as mentioned above, in Aggressive Mode: the first two messages negotiate policy, exchange Diffie-Hellman public values and ancillary data necessary for the exchange, and also identities; the second message authenticates the responder; and the third message authenticates the initiator and provides a proof of participation in the exchange.

Figure 5B:
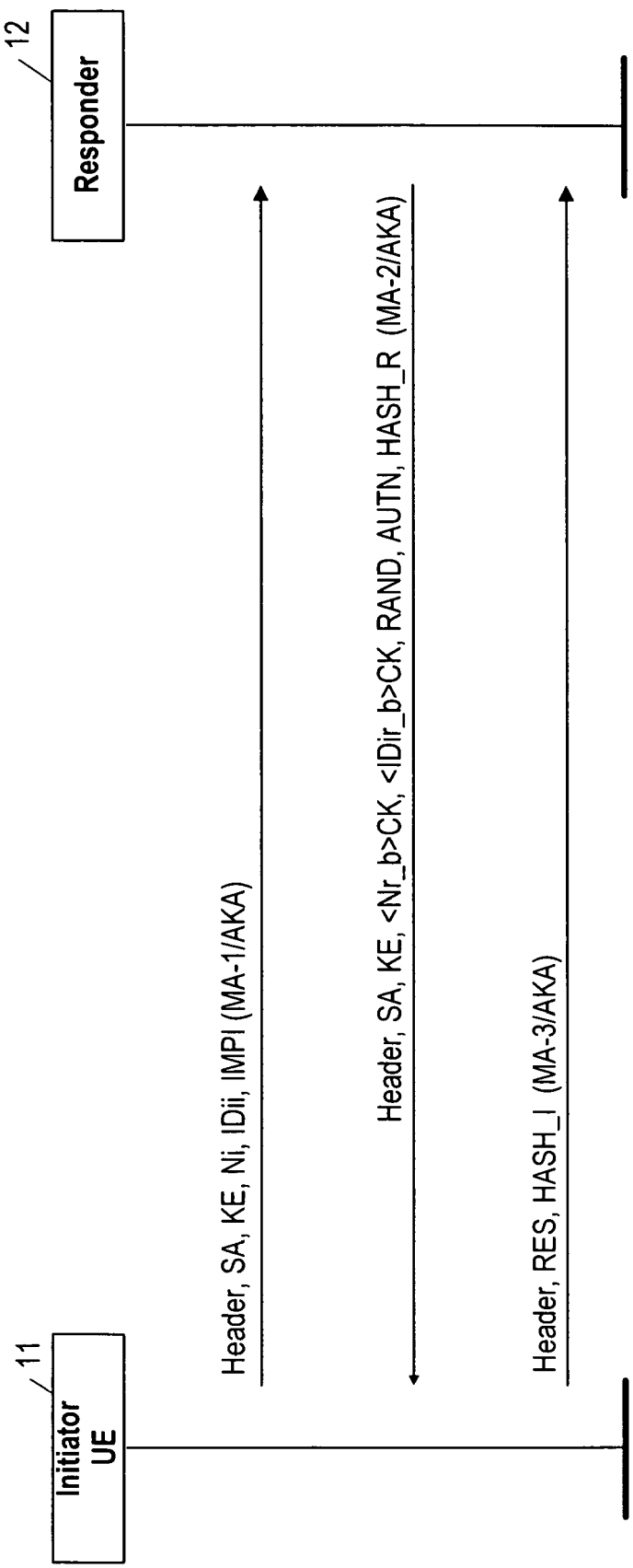
FIG. 5B is a messaging sequence diagram for the IKE phase 1 authentication in Aggressive Mode according to the invention, i.e. using the IMS AKA trust infrastructure, shown in respect to only an initiator and a responder (and not showing the message flows between the responder and the HSS for the initiator).

Referring now to FIG. 5B, the IKE AKA protocol for phase 1 authentication (and key agreement) in Aggressive Mode is shown as a message sequence diagram that is the same as in the IKE phase 1 authentication using public key encryption for Aggressive Mode (FIG. 5A) with respect to the initiator 11 and responder 12, except that the contents of the three message flows MA-1 through MM-3 are changed to replace the PKI trust infrastructure elements, resulting in message flows indicated as MA-x/AKA. More specifically, MA-1 is changed (to arrive at MA-1/AKA) in that,

[HASH(1),]KE,<IDii_b>PubKey_r,<Ni b>PubKey_r is changed to,

KE,Ni,IDii,IMPI.

MA-2 is changed (to arrive at MA-2/AKA) in that,

<IDir_b>PubKey_i,<Nr_b>PubKey_i is replaced by,

<Nr_b>CK,<IDir_b>CK,RAND,AUTN.

Finally, MA-3 is changed (to arrive at MA-3/AKA) in that the result RES is added to the message.

In addition to what is shown in FIG. 5B, there are the same data flows between the responder 12 and the HSS 14 for Aggressive Mode as there are for Main Mode, the data flows indicated in FIG. 3C.

Discussion

As noted above, the invention comprehends not only the arrangement illustrated in FIG. 1, where the HSS 14 is a third party server that is distinct from the responder 12 being authenticated, but also an arrangement in which the responder 12 itself has stored the long-term secret key K of the initiator 11 and so performs the functions indicated above as being performed by the HSS, i.e. the determining of the authentication vector including the authentication token AUTN used to authenticate the client and vice versa. In other words the invention also comprehends an arrangement in which there is no Sh interface.

The invention, providing the IKE AKA Protocol, is for use by terminals, at least one of which (the initiator or UE) has an ISIM card (and so is usually a 3G wireless terminal), communicating using a digital communication system and using IKE. The terminal bearing the ISIM card, typically referred to as the initiator or UE, can be any of several kinds. In TS 33.203, the UE is a mobile terminal (MT), i.e. a cellular phone. However, other kinds of UEs can advantageously practice the invention as well, including UEs without an integral MT component, but attached to an external MT, such as a laptop computer attached to a MT or to a mobile router, or other devices that communicate with a MT. It is important to understand that the list of devices given here is not intended to be exhaustive. In addition, some devices will not implement the complete functionality provided by the invention, but will support only a few services/applications provided by the IMS.

With respect to the digital communication system in which the invention may be practiced, in TS 33.203, the communication system is the UMTS Release 5 network; however, it is clear from what has been described that the invention is also of use in other communication systems besides the UMTS Release 5 network. In particular, any third party could implement a system that is operative according to the invention. For example, the communication system could even be the Internet, and the UE could be connected to the Internet via either a wireless or a wireline connection not involving some other communication system (e.g. the connection is a simple connection to the Internet via an Internet Service Provider) or via an intermediate communication system (e.g. a mobile phone connected to the Internet via UTRAN).

Scope of the Invention

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   an initiator sending a responder a message claiming an identity associated with a secret key;
   providing an authentication field and a random number field from the responder to the initiator;
   the initiator authenticating the responder based at least in part on the authentication field derived from the secret key without revealing the secret key; and
   the responder authenticating the initiator based at least in part on a result field derived from the secret key without revealing the secret key;
   wherein the secret key and the identity are provided out-of-band to both the initiator and at least one other entity, whereby the identity is associated with the secret key.

2. The method of claim 1, wherein, the result field is determined by the initiator using the secret key, but the authentication field is provided to the responder by a third-party entity distinct from the responder and trusted by the responder.

3. The method of claim 1,
   wherein the responder provides the authentication field and the random number field to the initiator, in response to a message flow from the initiator and also in response to the authentication field and the random number field provided by a third-party entity; and
   wherein the initiator authenticates the responder based on information conveyed by the authentication field and also based on the random number field.

4. The method of claim 1, further comprising:
   a third-party entity deriving the authentication field from the secret key.

5. The method of claim 1, further comprising:
   a third-party entity sending a message including an expected result field to the responder; and
   the responder using the result field to test whether the initiator is authentic by comparing the result field with the expected result field.

6. The method of claim 1, further comprising:
   the initiator calculating the result field based on the secret key and the random number field if the initiator determines the responder to be authentic.

7. The method of claim 1, wherein in performing authentication, the authentication field and the result field are determined by the initiator using the secret key and also by the responder using the secret key.

8. The method of claim 1, wherein a shared secret is obtained based at least in part on the random number which is derived from, without revealing, the secret key.

9. An initiator apparatus, operative according to the method of claim 1 in respect to the initiator.

10. A responder apparatus, operative according to the method of claim 1 in respect to the responder.

11. A responder apparatus, operative according to the method of claim 2 in respect to the responder.

12. A digital communication system including an initiator apparatus, a responder apparatus, and a third-party entity apparatus, wherein the initiator apparatus, the responder apparatus and the third-party entity apparatus are operative according to the method of claim 2 in respect to the initiator, the responder, and the third-party entity respectively.

13. A digital communication system including an initiator apparatus and a responder apparatus, characterized in that the initiator apparatus and the responder apparatus are operative according to the method of claim 1 in respect to the initiator and the responder respectively.

14. A method as in claim 1, wherein the authentication field and the result field are also derived from a random number and a sequence number using a predetermined set of functions.

15. An apparatus comprising:
a card for providing a message claiming an identity associated with a secret key for transmission;
a receiver for receiving an authentication field and a random number field from a device in communication with the apparatus; and
a module for performing authentication of the device in communication with the apparatus based on the authentication field which is derived from the secret key without revealing the secret key;
wherein the secret key and identity are provided out-of-band to the apparatus and at least one other entity.

16. The apparatus of claim 15, wherein the module is configured to determine a result field based at least on the secret.

17. The apparatus of claim 15, wherein the device is configured for receiving the secret key from a third-party entity distinct from and trusted by the device.

18. The apparatus of claim 15,
wherein the module is responsive to the authentication field and the random number field for testing whether the device is authentic based on information conveyed by the authentication field and also based on the random number field.

19. The apparatus of claim 15, further comprising:
a receiver for receiving an expected result field from the third-party entity; and
wherein the module is configured to use a result field to test whether the device is authentic by comparing the result field with the expected result field.

20. The apparatus of claim 15, wherein the module is configured to calculate a result field based on the secret key and the random number field if the apparatus determines the device to be authentic.

21. The apparatus of claim 15, wherein a shared secret is obtained based on information derived from, but not revealing, the secret key.

22. The apparatus of claim 15, wherein the module is configured to use a predetermined set of functions to derive information from a random number and a sequence number.

23. An apparatus comprising:
means for providing a message claiming an identity associated with a secret key for transmission;
means for receiving an authentication field and a random number field from a device in communication with the apparatus, and
means for performing authentication of the device in communication with the apparatus based on the authentication field which is derived from the secret key without revealing the secret key;
wherein the secret key and identity are provided out-of-band to the apparatus and at least one other entity.

24. The apparatus of claim 23, further comprising means for determining a result field based at least in part on the secret key.

* * * * *